United States Patent Office 3,342,799
Patented Sept. 19, 1967

3,342,799
N-HETEROCYCLIC MONOAZO AZO DYES
David J. Wallace, James M. Straley, and Max A. Weaver, Kingsport, Tenn., assignors to Eastman Kodak Company, Rochester, N.Y., a corporation of New Jersey
No Drawing. Filed Aug. 17, 1964, Ser. No. 390,212
10 Claims. (Cl. 260—152)

ABSTRACT OF THE DISCLOSURE

Phenylazophenyl compounds are useful as dyes for hydrophobic textile materials and are characterized by a heterocyclic group attached to the coupler moiety and having the formula

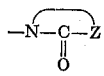

wherein Z represents the carbon atoms completing a pyrrolidinono radical, a piperidono radical, or a phthalimidino radical.

---

This invention relates to azo compounds, particularly useful as dyes for textile fibers.

The azo compounds have the following general formula

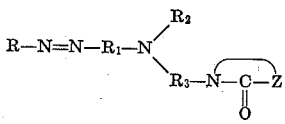

wherein R represents a benzene radical including phenyl and phenyl substituted with lower alkyl sulfonyl, e.g., 2-methylsulfonyl, 4-methylsulfonyl; nitro, e.g. 4-nitro and 4,6-dinitro; lower alkyl, e.g. p-methyl; halogen, e.g., 2-chloro, 2,5-dichloro; cyano, e.g. 2-cyano, 4-cyano; lower alkoxy, e.g., p-methoxy, lower hydroxyalkyl, lower cyanoalkyl, lower alkoxyalkyl, lower carboalkoxy, lower fluoroalkyl, lower carboalkoxyalkyl, lower haloalkyl, lower phenylalkylsulfonyl, lower aliphatic acyl, sulfonamido, alkylsulfonamido, and other radicals as present in the azo compounds disclosed hereinafter. $R_1$ represents a phenylene radical including, for example, o-, m- and p-phenylene radicals and o-, m- and p-phenylene radicals substituted with groups such as alkyl and substituted alkyl, particularly lower alkyl of 1 to 4 carbon atoms, e.g. m-tolylene

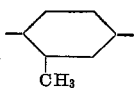

alkoxy and substituted alkoxy particularly lower alkoxy of 1 to 4 carbon atoms, acylamido such as acetamido, halogen including chlorine and bromine. $R_2$ represents hydrogen or an alkyl radical especially lower alkyl of 1 to 4 carbon atoms, and substituted alkyl such as lower alkoxyalkyl, lower acyloxalkyl, lower carboxamidoalkyl, lower cyanoalkyl, lower hydroxalkyl, lower chloroalkyl and bromoalkyl, lower acetoxyalkyl, lower carbalkoxyalkyl and lower alkylsulfonylalkyl. $R_3$ represents lower alkylene of 1 to 4 carbon atoms. Z represents a chain of carbon atoms which together with

are necessary to complete a pyrrolidinono radical, a piperidono radical, or phthalimidino radical such as propylene, iso-propylene, butylene,

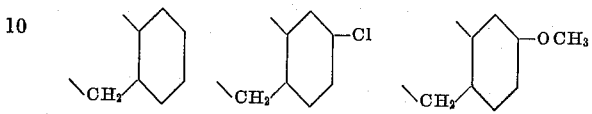

in which the atoms represented by Z are a part of a fused-on benzene radical.

The azo compounds are prepared by diazotization in known manner of aniline or well-known aniline derivatives and coupling with coupling components having the formula

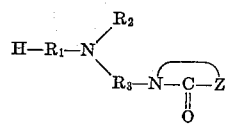

wherein $R_1$, $R_2$, $R_3$ and Z have the meaning given above.

The above coupling components in which the ring

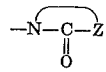

is monocyclic, can be prepared by reacting an aniline derivative with butyrolactones or caprolactones as described in Example 1. The above coupling components in which the ring

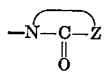

is bicyclic can be prepared by reacting an N-aminoalkylaniline with phthalide or substituted phthalides such as chlorophthalide or an alkoxyphthalide, as described in Example 5.

The azo compounds can be expected to possess properties distinct from similar azo compounds in which the ring

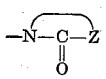

is connected directly to the benzene nucleus of a coupler in that they have better affinity and light fastness for polyesters.

Representative aromatic amines useful for diazotization and coupling with the above coupling components are aniline, 4-nitroaniline, 2-nitro-4-chloroaniline, 2,6-dichloro-4-nitroaniline, 2 - methylsulfonyl-4-nitroaniline, 4-cyanoaniline, p-toluidine, 4-trifluoromethylaniline, 4-sulfonamidoaniline, 4 - dimethylsulfonamidoaniline, 4-methoxyaniline, 4-cyanoethylaniline and 4-chloroethylaniline.

The azo compounds can be used for dyeing textile materials including synthetic polymer fibers, yarns and fabrics giving fast shades when applied by conventional dyeing methods to cellulose ester, polyamide and polyester fibers. When the azo compounds are used for dyeing such hydrophobic materials, they should be free of water-solubilizing groups such as sulfo and carboxyl groups. In general, the dyes have good fastness, for example, to light, washing, gas (atmospheric fumes) and sublimation.

The following examples will serve to illustrate the preparation of representative intermediates and azo compounds of our invention.

EXAMPLE 1

A. Preparation of the coupler 89.0 g. N-β-aminoethyl-N-ethyl-m-toluidine and 47.3 g. of butyrolactone were refluxed together for 10 hrs. with water removed. The mixture was distilled in vacuo. The pure product distilled at 150–152° C./.1 mm. and had the structure:

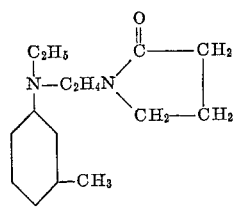

B. Preparation of the dye 6.9 g. p-nitroaniline was dissolved in 5.4 ml. conc. sulfuric acid and 12.6 ml. water. This solution was poured onto 50 g. of ice and then a solution of 3.6 g. sodium nitrite in 8 ml. water was added all at once. The diazotization was stirred at 5° C. for 1 hr., resulting in almost complete solution. After filtration, the diazonium solution was added to a chilled solution of 12.3 g. of the coupler from 1(A) in 200 ml. 15% sulfuric acid. The coupling was neutralized to brown color on Congo Red paper with ammonium acetate and allowed to couple 2 hours. The product dyes cellulose acetate and polyesters a deep scarlet shade with excellent light fastness on cellulose acetate and Kodel polyester.

EXAMPLE 2

A. Preparation of the coupler 21.8 g. N-[β-(m-toluidino)ethyl]-2-pyrrolidinone, 4.1 g. cupric acetate monohydrate, 1 g. hydroquinone, and 53 g. acrylonitrile were refluxed together for 24 hrs. The inorganic material was filtered off, and the excess acrylonitrile evaporated from the filtrate under vacuum. The product was:

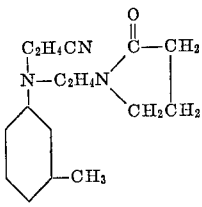

B. Preparation of the dye

The diazonium solution was prepared as in 1(B) and added to a chilled solution of 13.55 g. of the coupler from 2(A) in 100 ml. 1:5 acid (1 part propionic acid:5 parts acetic acid). The coupling was neutralized with solid ammonium acetate to brown on Congo red paper and allowed to couple 1 hour. It was then drowned with water, filtered, washed with water, and dried. The product dyes cellulose acetate, nylon and polyester fibers bright orange shades of unusually good fastness properties. The dye is:

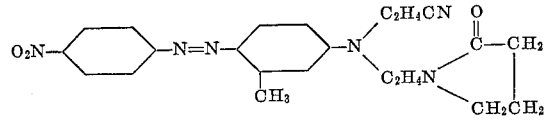

EXAMPLE 3

8.28 g. 2,6-dichloro-4-nitroaniline was dissolved in 50 ml. conc. culfuric acid, and the solution cooled to 3° C. in an ice-bath. A solution of 2.88 g. sodium nitrite in 20 ml. conc. sulfuric acid was added slowly with stirring. Stirring was continued for 3 hrs. with the temperature kept below 10° C. This diazonium was added to a chilled solution of 10.84 g. of the coupler from 2(A). The solution was kept cold and neutralized with ammonium acetate. After coupling 1 hour, the mixture was drowned with water. The product solidified on standing and was filtered off, washed with water, and dried. The product dyes cellulose acetate and polyester fibers a desirable burnt orange shade of excellent fastness properties.

EXAMPLE 4

A solution of 1.07 g. p-toluidine in 20 ml. water containing 3 ml. conc. HCl was cooled to 5° C. and a solution of 0.76 g. NaNO$_2$ in 4 ml. water was added all at once. The diazotization was stirred 1 hour at 5° C., then added to a solution of 2.46 g. of the coupler from 1(A) in 25 ml. water containing 2 ml. conc. HCl cooled internally with ice. The coupling was neutralized with ammonium acetate, then coupled 4 hours. The product was filtered off, washed with water, and dried. It dyes cellulose acetate, nylon, and polyester fibers bright yellow shades.

EXAMPLE 5

A. Preparation of the coupler 89.0 g. N-2-aminoethyl-N-ethyl-m-toluidine, 67.0 g. phthalide, and 1 g. sulfanilic acid were stirred together and heated at 125–130° under water-removal traps for 2.5 hr. Distillation gave a viscous oil, B.P. 198–204° C./0.50 mm. It has the structure:

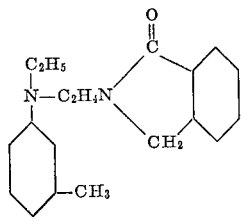

B. Preparation of the dye 6.9 g. p-nitroaniline was diazotized and coupled with 14.7 g. of the above coupler as described in Example 4 to give a bright orange dye of excellent fastness on cellulose acetate and polyesters. The dye has the formula:

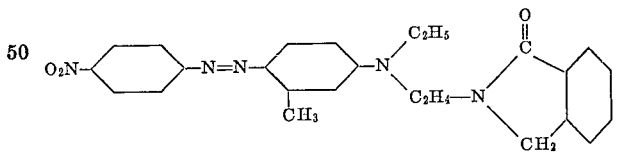

In the manner of the above examples, additional azo compounds having the formula designated above are prepared by coupling the diazotized aminobenzene with the coupler indicated in the following table; thus the method of Example 2 can be used to prepare the compound of Example 6 and the method of Example 5 can be used for preparing the compound of Example 35.

Similarly the compound of Example 24 is prepared as in Example 1(A) using an equivalent of N-β-aminoethyl-N-β-hydroxyethyl-m-toluidine in place of the N-β-aminoethyl-N-ethyl-m-toluidine. The dye was made as in Example 3, using the same diazonium component as Example 3 and 10.7 g. of the above coupler. The azo compound has the formula

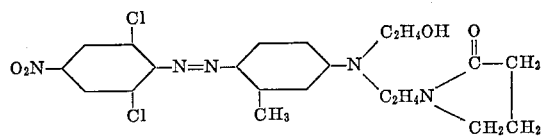

| Ex. | Substituents on Diazo Ring R | Coupler Component | | | | Color |
|---|---|---|---|---|---|---|
| | | $R_1$ | $R_2$ | $R_3$ | Z | |
| 6 | p-$NO_2$ | p-Phenylene | —$CH_2CH_2CN$ | —$CH_2CH_2$— | —$CH_2CH_2CH_2$— | Orange. |
| 7 | p-$NO_2$ | m-Tolylene | —$CH_2CH_2OH$ | —$CH_2CH_2$— | —$CH_2CH_2CH_2$— | Scarlet. |
| 8 | p-$NO_2$ | do | —$CH_2CH_2Cl$ | —$CH_2CH_2$— | —$CH_2CH_2CH_2$— | Do. |
| 9 | p-$NO_2$ | do | —$CH_2CH_2OCH_3$ | —$CH_2CH_2$— | —$CH_2CH_2CH_2$— | Do. |
| 10 | p-$NO_2$ | do | —$CH_2CH_2OCOCH_3$ | —$CH_2CH_2$— | —$CH_2CH_2CH_2$— | Do. |
| 11 | p-$NO_2$ | do | —$CH_2CH_2CO_2C_2H_5$ | —$CH_2CH_2$— | —$CH_2CH_2CH_2$— | Do. |
| 12 | p-$NO_2$ | do | —$CH_2CH_2Br$ | —$CH_2CH_2$— | —$CH_2CH_2CH_2$— | Orange. |
| 13 | p-$NO_2$ | do | —$CH_2CH_2SO_2CH_3$ | —$CH_2CH_2$— | —$CH_2CH_2CH_2$— | Do. |
| 14 | p-$NO_2$ | do | H | —$CH_2CH_2$— | —$CH_2CH_2CH_2$— | Do. |
| 15 | p-$NO_2$ | do | —$CH_2CH_2CONH_2$ | —$CH_2CH_2$— | —$CH_2CH_2CH_2$— | Do. |
| 16 | 2-$NO_2$-4-Cl | do | —$CH_2CH_2CN$ | —$CH_2CH_2$— | —$CH_2CH_2CH_2$— | Do. |
| 17 | 2-$NO_2$-4-Cl | do | —$CH_2CH_2OH$ | —$CH_2CH_2$— | —$CH_2CH_2CH_2$— | Red. |
| 18 | 2-$NO_2$-4-Cl | m-$OCH_3$-p-phenylene | —$CH_2CH_2CN$ | —$CH_2CH_2$— | —$CH_2CH_2CH_2$— | Red. |
| 19 | 2-$NO_2$-4-Cl | m-Cl-p-phenylene | —$CH_2CH_2OH$ | —$CH_2CH_2$— | —$CH_2CH_2CH_2$— | Red. |
| 20 | 2-$NO_2$-4-Cl | 2-$OCH_3$-5-$CH_3$-p-phenylene | —$CH_2CH_2CN$ | —$CH_2CH_2$— | —$CH_2CH_2CH_2$— | Red. |
| 21 | 2-$NO_2$-4-Cl | m-$NHCOCH_3$-p-phenylene | —$CH_2CH_2CN$ | —$CH_2CH_2$— | —$CH_2CH_2CH_2$— | Pink. |
| 22 | 2-$NO_2$-4-Cl | o-Tolylene | H | —$CH_2CH_2$— | —$CH_2CH_2CH_2$— | Violet. |
| 23 | 2-$NO_2$-4-Cl | 2,5-di-$OCH_3$-p-phenylene | —$CH_2CH_2OH$ | —$CH_2CH_2$— | —$CH_2CH_2CH_2$— | Orange. |
| 24 | 2,6-di-Cl-4-$NO_2$ | m-Tolylene | —$CH_2CH_2OH$ | —$CH_2CH_2$— | —$CH_2CH_2CH_2$— | Violet. |
| 25 | 2,6-di-Cl-4-$NO_2$ | do | H | —$CH_2CH_2$— | —$CH_2CH_2CH_2$— | Orange. |
| 26 | None | do | —$CH_2CH_2CN$ | —$CH_2CH_2$— | —$CH_2CH_2CH_2$— | Do. |
| 27 | do | do | —$CH_2CH_2OH$ | —$CH_2CH_2$— | —$CH_2CH_2CH_2$— | Yellow. |
| 28 | 2-$CH_3SO_2$-4-$NO_2$ | p-Phenylene | —$CH_2CH_2OH$ | —$CH_2CH_2$— | —$CH_2CH_2CH_2$— | Do. |
| 29 | 2-$CH_3SO_2$-4-$NO_2$ | m-Tolylene | —$CH_2CH_2CN$ | —$CH_2CH_2$— | —$CH_2CH_2CH_2$— | Red. |
| 30 | 2-$CH_3SO_2$-4-$NO_2$ | do | —$CH_2CH_2CN$ | —$CH_2CH_2CH_2$— | —$CH_2CH_2CH_2$— | Pink. |
| 31 | 2-$CH_3SO_2$-4-$NO_2$ | do | —$CH_2CH_2CN$ | —$CH_2\overset{CH_3}{\underset{\|}{CH}}CH_2$— | —$CH_2CH_2$— | Do. |
| 32 | 2-$CH_3SO_2$-4-$NO_2$ | do | —$CH_2CH_2CN$ | —$CH_2CH_2$— | —$\overset{CH_3}{\underset{\|}{CH}}CH_2CH_2$— | Do. |
| 33 | 2-$CH_3SO_2$-4-$NO_2$ | do | —$CH_2CH_2CN$ | —$CH_2CH_2$— | —$CH_2$—⟨phenyl⟩ | Violet. |
| 34 | 2-$CH_3SO_2$-4-$NO_2$ | do | —$CH_2CH_2CN$ | —$CH_2CH_2$— | —$CH_2CH_2CH_2CH_2$— | Pink. |
| 35 | 2-$CH_3SO_2$-4-$NO_2$ | do | —$CH_2CH_2CN$ | —$CH_2CH_2$— | —$CH_2$—⟨phenyl-Cl⟩ | Do. |
| 36 | 2-$CH_3SO_2$-4-$NO_2$ | do | —$CH_2CH_2CN$ | —$CH_2CH_2$— | —$CH_2$—⟨phenyl-$OCH_3$⟩ | Do. |
| 37 | p-CN | do | —$CH_2CH_2CN$ | —$CH_2CH_2$— | —$CH_2CH_2CH_2$— | Orange. |
| 38 | p-CN | do | —$CH_2CH_2OH$ | —$CH_2CH_2$— | —$CH_2CH_2CH_2$— | Do. |
| 39 | p-CN | do | —$CH_2CH_2OH$ | —$CH_2CH_2$— | —$CH_2CH_2CH_2$— | Do. |
| 40 | p-$CH_3$ | p-Phenylene | —$C_2H_5$ | —$CH_2CH_2$— | —$CH_2CH_2CH_2$— | Yellow. |
| 41 | p-$CH_3$ | do | —$C_2H_5$ | —$CH_2CH_2$— | —$CH_2CH_2CH_2CH_2$— | Do. |
| 42 | p-$CH_3$ | m-Tolylene | —$CH_2CH_2OH$ | —$CH_2CH_2$— | —$CH_2CH_2CH_2CH_2$— | Do. |
| 43 | p-$SO_2NH_2$ | do | —$CH_2CH_2OH$ | —$CH_2CH_2$— | —$CH_2CH_2CH_2CH_2$— | Red. |
| 44 | p-$SO_2NH_2$ | do | —$CH_2CH_2CN$ | —$CH_2CH_2$— | —$CH_2CH_2CH_2CH_2$— | Red. |
| 45 | p-$CF_3$ | do | —$CH_2CH_2CN$ | —$CH_2CH_2$— | —$CH_2CH_2CH_2CH_2$— | Red. |
| 46 | p-$SO_2N(CH_3)_2$ | do | —$CH_2CH_2CN$ | —$CH_2CH_2$— | —$CH_2CH_2CH_2CH_2$— | Red. |
| 47 | 2,6-di-Cl-4-$NO_2$ | do | —$C_2H_5$ | —$CH_2CH_2$— | —$CH_2CH_2CH_2CH_2$— | Brown. |
| 48 | 4-$NO_2$ | do | —$C_2H_4CN$ | —$CH_2CH_2$— | —$CH_2$—⟨phenyl⟩ | Orange. |
| 49 | 2-Cl-4-$NO_2$ | do | —$C_2H_4CN$ | —$CH_2CH_2$— | —$CH_2$—⟨phenyl⟩ | Scarlet. |
| 50 | 4-$CH_3$ | do | —$C_2H_5$ | —$CH_2CH_2$— | —$CH_2CH_2CH_2$— | Yellow. |
| 51 | 2-Cl-4-$NO_2$ | p-Phenylene | —$C_2H_5$ | —$CH_2CH_2$— | —$CH_2CH_2CH_2$— | Orange. |
| 52 | 2-Cl-4-$NO_2$ | do | —$CH_2CHOHCH_2Cl$ | —$CH_2CH_2$— | —$CH_2CH_2CH_2$— | Do. |
| 53 | 2-Cl-4-$NO_2$ | m-Tolylene | —$CH_2CHOHCH_2Cl$ | —$CH_2CH_2$— | —$CH_2CH_2CH_2$— | Scarlet. |

It will be apparent from the above description of the invention that in the azo compounds having the general formula above, the substituents attached to R, $R_1$, $R_2$, $R_3$ and Z are not critical and serve primarily as auxochrome groups to control the color of the azo compounds, and compounds which contain the disclosed substituents are especially useful as textile dyes. The fundamental properties of the azo compounds are attributed to the whole molecule of the azo compound to which the radical

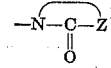

is indirectly attached.

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 3,043,827. The following example illustrates methods by which the azo compounds of the invention can be used to dye textile materials.

0.1 gram of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda-ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material.

Cellulose esters which can be dyed with the azo compounds include cellulose aliphatic carboxylic acid esters having 2 to 4 carbon atoms in the acyl groups thereof, by which we mean to include, for example, both partially hydrolyzed and unhydrolyzed cellulose acetate, cellulose propionate and cellulose acetate-butyrate.

Polymeric linear polyester materials of the terephthalate type are illustrative of the linear aromatic polyester textile materials that can be dyed with the new azo compounds of our invention. The terephthalate fibers sold under the trademarks Kodel, Dacron and Terylene, for example, in the form of filaments, yarn and fabric, for example, are illustrative of the polyester textile materials than can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C. Nylon, in fiber yarn and fabric form, is respresentative of polyamides which can be dyed with the azo compounds.

The invention has been described in considerable detail with particular reference to certain preferred embodiments thereof, but it will be understood that variations and modifications can be effected within the spirit and scope of the invention as described hereinabove, and as defined in the appended claims.

What we claim is:
1. Azo compounds having the formula

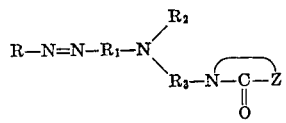

wherein
R=a benzene radical,
R$_1$=a phenylene radical,
R$_2$=a member of the class consisting of hydrogen and a lower alkyl radical,
R$_3$=lower alkylene, and
Z=the carbon atoms which with

complete a pyrrolidinono radical, a piperidono radical, or a phthalimidino radical, said compounds being free of water-solubilizing groups.

2. Azo compounds having the formula of claim 1 wherein R$_2$ represents a lower alkyl radical and Z represents the carbon atoms which with

complete a pyrrolidinone radical.

3. Azo compounds having the formula

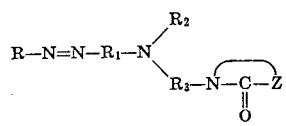

wherein
R=a benzene radical,
R$_1$=a p-phenylene radical,
R$_2$=lower alkyl,
R$_3$=lower alkylene, and
Z=the carbon atoms which with

complete a pyrrolidinone radical, said compounds being free of water solubilizing groups.

4. The azo compound having the formula

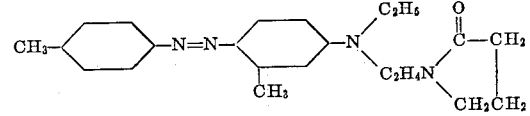

5. The azo compound having the formula

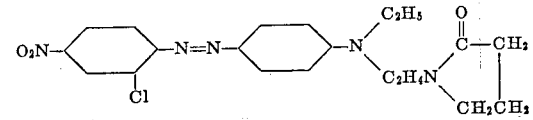

6. The azo compound having the formula

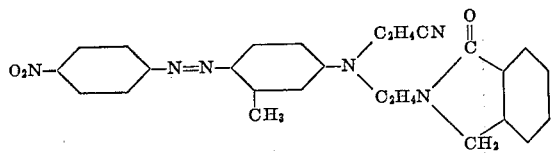

7. The azo compound having the formula

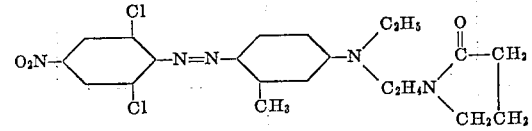

8. The azo compound having the formula

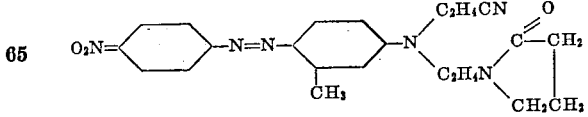

9. The azo compound having the formula

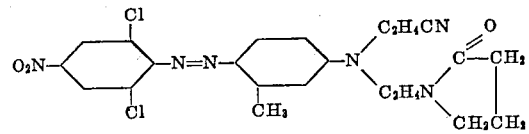

10. The azo compound having the formula
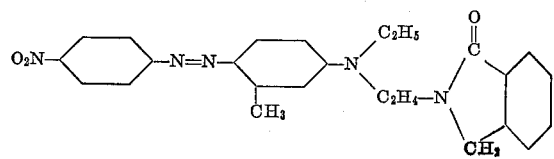
References Cited
UNITED STATES PATENTS
3,148,178  9/1964  Wallace et al. _____ 260—152
CHARLES B. PARKER, *Primary Examiner.*
D. PAPUGA, *Assistant Examiner.*